United States Patent
Dubey et al.

(10) Patent No.: US 8,287,269 B2
(45) Date of Patent: Oct. 16, 2012

(54) MOLDS FOR USE IN CONTACT LENS PRODUCTION

(75) Inventors: Dharmesh K. Dubey, Jacksonville, FL (US); Xu Song, Jacksonville, FL (US); Mark E. Schlagel, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1689 days.

(21) Appl. No.: 11/299,641

(22) Filed: Dec. 12, 2005

(65) Prior Publication Data
US 2007/0132124 A1   Jun. 14, 2007

(51) Int. Cl.
*B29D 11/00* (2006.01)
(52) U.S. Cl. ........ 425/408; 425/410; 425/412; 425/808; 264/1.32; 249/160
(58) Field of Classification Search ................. 425/215, 425/808, 408, 410, 412; 249/134, 160; 264/1.32
See application file for complete search history.

(56) References Cited

U.S. PATENT DOCUMENTS

| | | | | |
|---|---|---|---|---|
| 4,113,224 A * | 9/1978 | Clark et al. | ................ | 249/105 |
| 4,209,289 A * | 6/1980 | Newcomb et al. | ............ | 425/410 |
| 4,284,399 A * | 8/1981 | Newcomb et al. | ............ | 425/410 |
| 5,036,971 A * | 8/1991 | Seden et al. | ................ | 206/5.1 |
| 5,540,410 A * | 7/1996 | Lust et al. | ................ | 249/134 |
| 5,861,114 A * | 1/1999 | Roffman et al. | ............ | 264/2.5 |
| 6,257,547 B1 * | 7/2001 | Togo et al. | ................ | 249/160 |
| 6,405,993 B1 * | 6/2002 | Morris | ................ | 249/141 |
| 6,444,145 B1 * | 9/2002 | Clutterbuck | ............ | 264/1.1 |
| 6,491,281 B1 * | 12/2002 | Gotou et al. | ............ | 249/114.1 |
| 7,320,587 B2 * | 1/2008 | Goodenough et al. | ........ | 425/542 |
| 2005/0100631 A1 | 5/2005 | Baba et al. | | |
| 2006/0006558 A1 * | 1/2006 | Yamada | ................ | 264/2.2 |

FOREIGN PATENT DOCUMENTS

| | | |
|---|---|---|
| EP | 0484090 | 5/1992 |
| EP | 545720 A1 * | 6/1993 |
| EP | 1040907 | 10/2000 |
| EP | 1407866 | 4/2004 |
| EP | 1407866 A1 * | 4/2004 |
| GB | 2235407 A * | 3/1991 |
| GB | 2329356 | 3/1999 |
| JP | 05337957 A * | 12/1993 |
| JP | 2003011139 A | 1/2003 |
| JP | 2003019724 A | 1/2003 |
| JP | 2003508268 A | 3/2003 |
| JP | 2003516247 A | 5/2003 |
| JP | 2005138416 A | 6/2005 |
| WO | WO 01/42001 | 6/2001 |

OTHER PUBLICATIONS

PCT International Search Report, dated Mar. 23, 2007, for PCT Int'l. Appln. No. PCT/US2006/046754.

* cited by examiner

*Primary Examiner* — Dimple Bodawala

(57) ABSTRACT

The invention provides molds useful in the production of contact lenses having seamless edges and in which molds movement of one mold half in relation to the other mold half is decreased. These results are attained by providing mold halves with shoulder stops and seam-matching features.

6 Claims, 6 Drawing Sheets

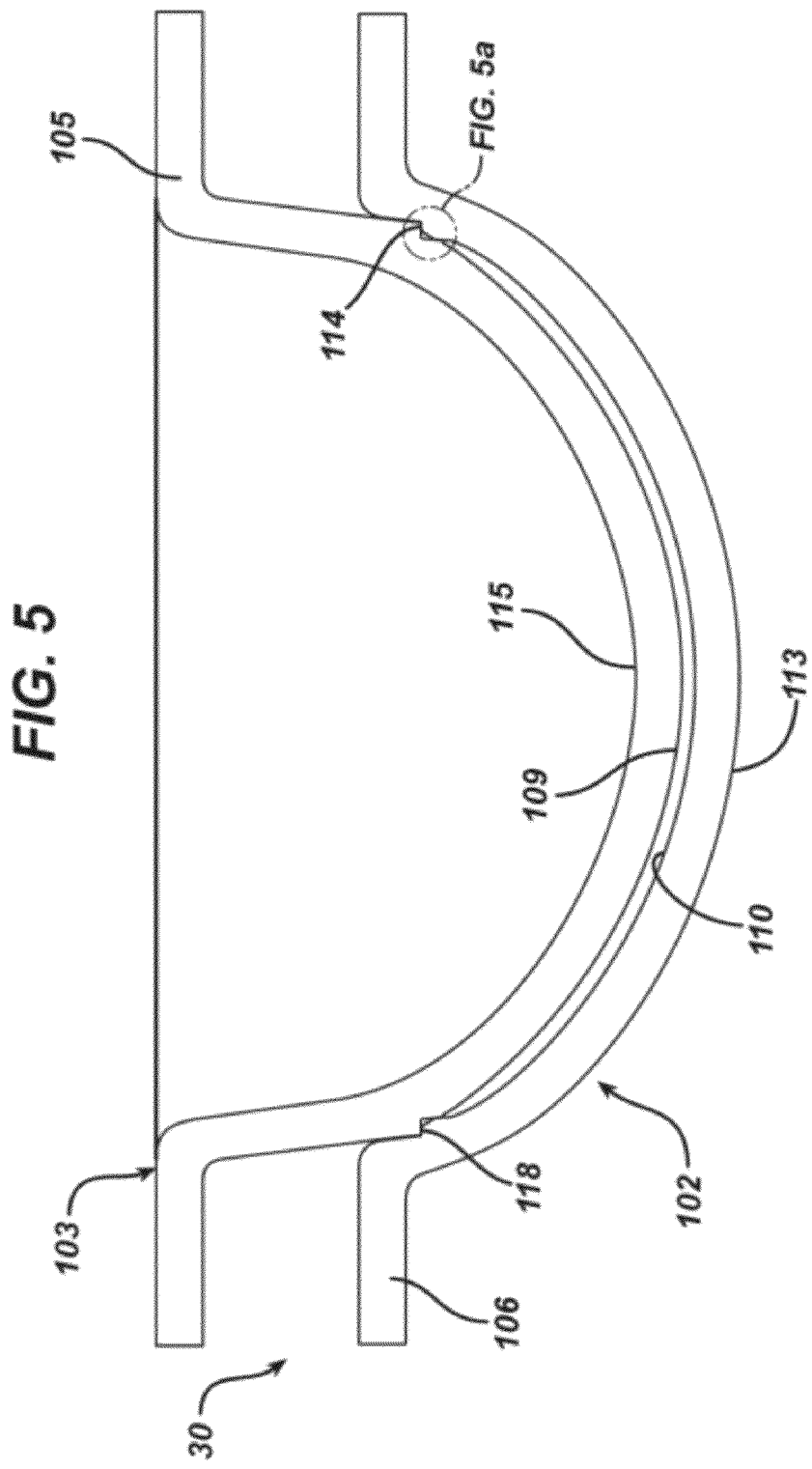

MOLDS FOR USE IN CONTACT LENS PRODUCTION

FIELD OF THE INVENTION

The invention relates to molds useful in the manufacture of contact lenses. In particular, the molds of the invention provide for the production of lenses with seamless edges.

BACKGROUND OF THE INVENTION

Methods and molds useful in the manufacture of contact lenses are well known. For example, in U.S. Pat. No. 5,540,410, incorporated herein in its entirety by reference, are disclosed molds and their use in contact lens manufacture. However, the known lens molds are disadvantageous in that they do not permit production of lens edges without seams. By "seam" is meant a line or demarcation formed by excess lens material. Referring to the drawings, in FIG. 1 is illustrated a close-up cross-sectional side view of lens edge 10 that has a seam 11. The presence of such seams is disadvantageous in that the seam may contact the conjunctiva and cause surface roughness, discomfort, or both. Additionally, known lens molds are disadvantageous in that they permit movement of one mold half of a mold assembly in relation to the other mold half. This movement results in the lens edge shape varying from one side of the lens to the other. For example, as shown in FIG. 2a is one lens edge of one side of a lens and has a different shape than that of the lens edge of the opposite side of the same lens shown FIG. 2b.

BRIEF DESCRIPTION OF THE DRAWINGS

FIG. 5 is a close-up, cross sectional view of a mold assembly that is the front mold half of FIG. 3 fitted with the back mold half of FIG. 4.

DETAILED DESCRIPTION OF THE INVENTION AND PREFERRED EMBODIMENTS

The molds of the invention permit formation of a contact lens having a seamless edge. Additionally, mold half movement is decreased in the molds of the invention resulting in the production of lenses with reduced edge variation. It is a discovery of the invention that these results can be in which there is attained by providing a mold with a shoulder stop and a seam-matching feature.

In one embodiment, the invention provides a mold for production of a contact lens comprising, consisting essentially of, and consisting of a front curve mold half and a back curve mold half wherein each of the mold halves has a shoulder stop and a conical seam.

Figure 1:
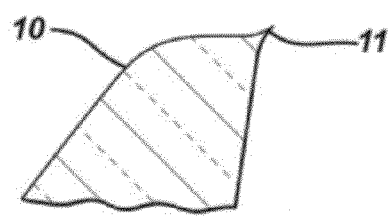
FIG. 1 is a close-up, cross-sectional side view of a seamed lens edge.
Figure 2A:
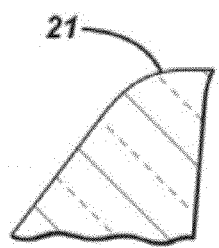
FIG. 2a is a close-up, cross-sectional side view of a first lens edge of a first side of a lens.
Figure 2B:
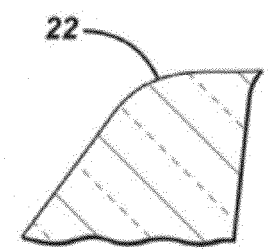
FIG. 2b is a close-up, cross-sectional side view of a second lens edge of a second side of the lens of FIG. 2.
Figure 3:
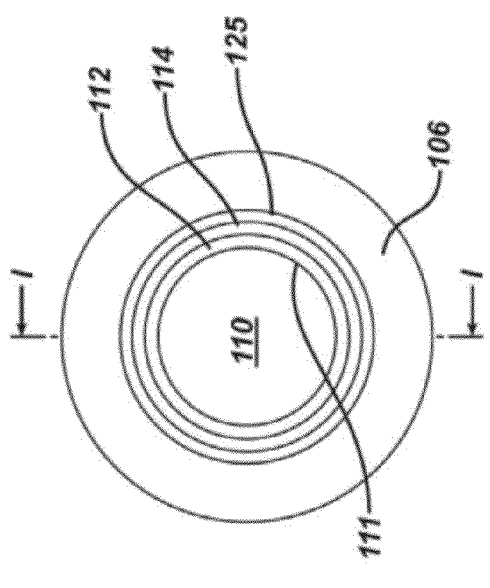
FIG. 3 is a top elevational view of a front mold half of a mold of the invention.
Figure 3A:
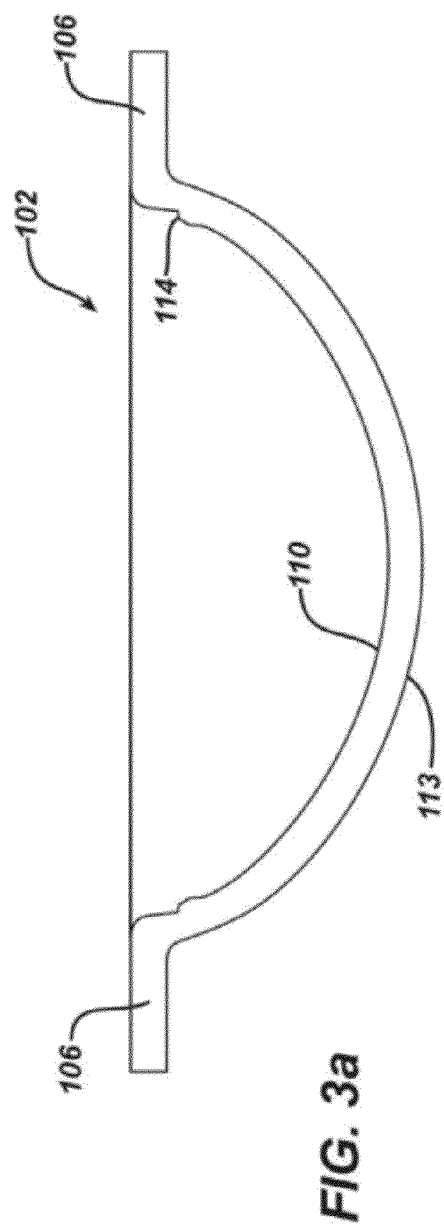
FIG. 3a is a cross-sectional view of the mold half of FIG. 3 along I-I.
Figure 5A:
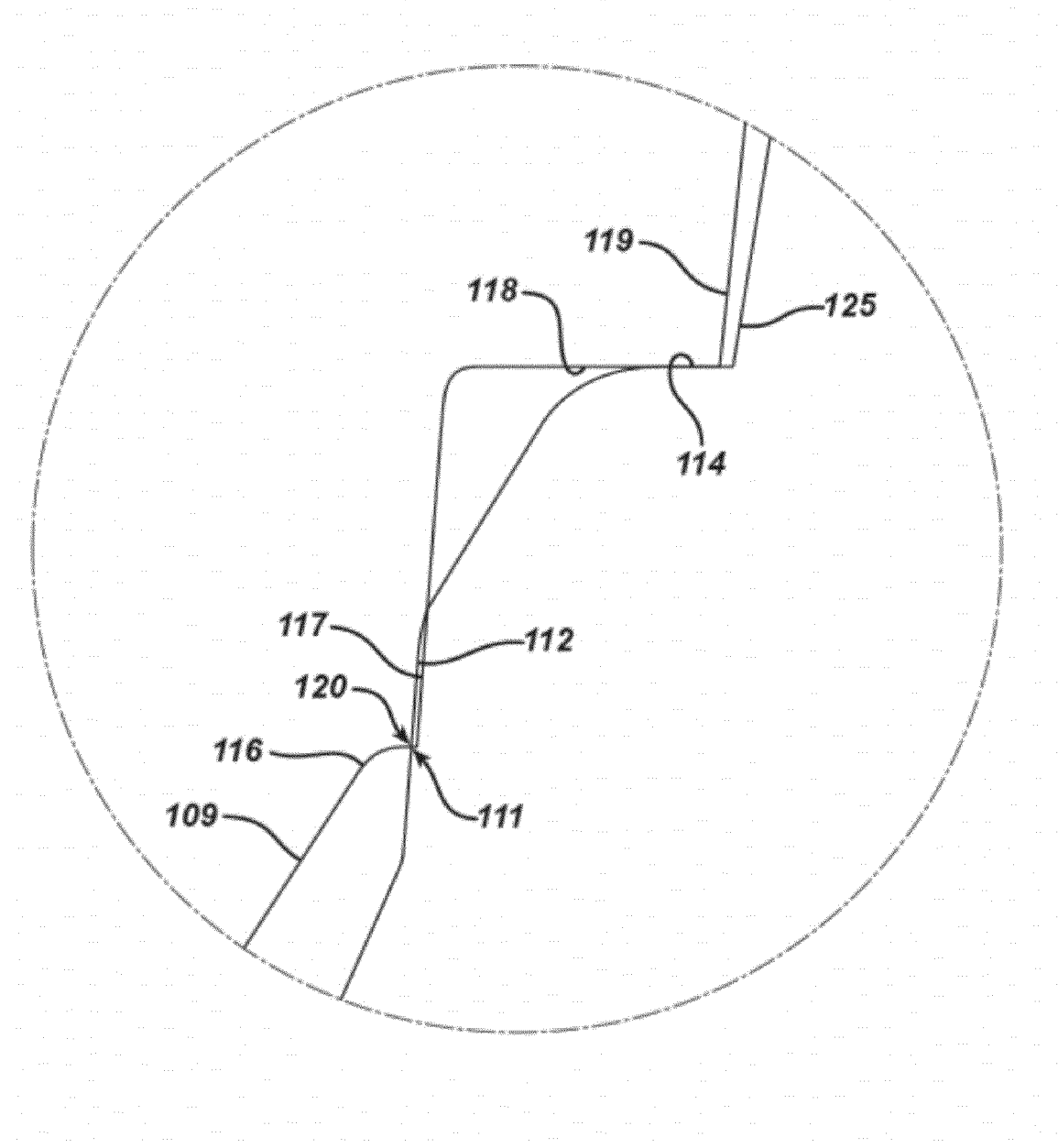
FIG. 5a is a close-up, cross-sectional view of an area of the mold of FIG. 5.

Referring to FIGS. 3, 3a, and 5a, front mold half 102 is shown with convex surface 113 spaced generally parallel and apart from concave surface 110 and an essentially uniplanar annular flange 106. Flange 106 is integral with guidewall 125 and extends radially outwardly from the surfaces 110 and 113 in a plane normal, or perpendicular, to the axis of symmetry of the concave surface 110. The front mold conical seam 112 is continuous with shoulder 114, which surface is continuous with guidewall 125. Concave surface 110 has the dimensions of the front curve of the unswelled lens to be cast in the mold and is sufficiently smooth so that the contact lens surface formed is of optically acceptable quality. Convex surface 113 need not have a surface suitable to form an optical quality surface.

Figure 4:
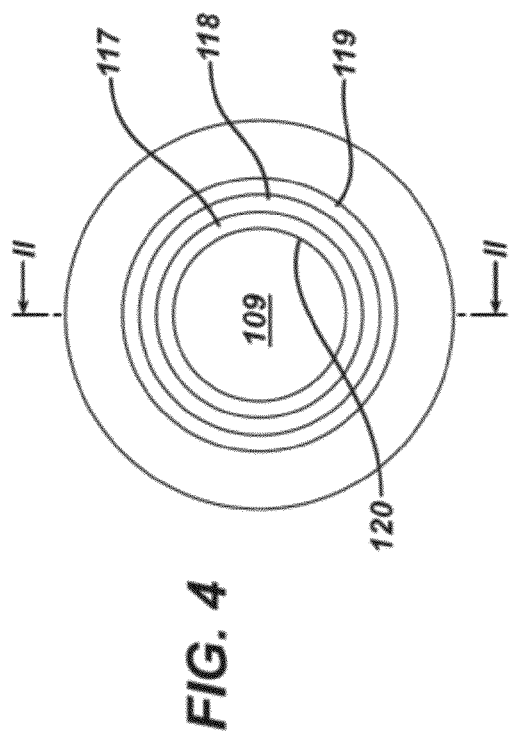
FIG. 4 is a top elevational view of a back mold half of a mold of the invention.
Figure 4A:
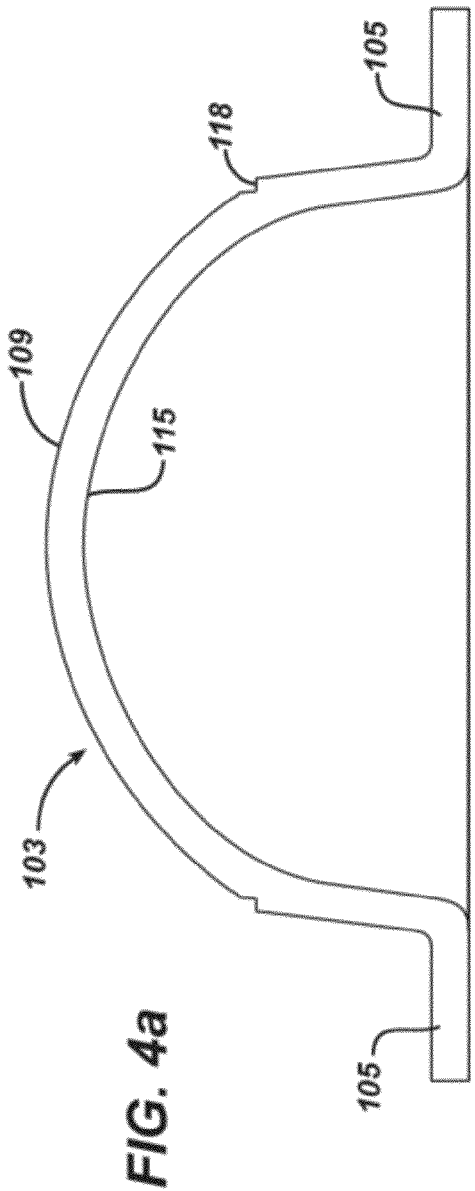
FIG. 4a is a cross-sectional view of the mold half of FIG. 4 along II-II.

As shown on FIGS. 4, 4a, and 5a, back mold half 103 has spaced surfaces 109 and 115 and an essentially uniplanar annular flange 105 extending radially outwardly therefrom in a plane normal to the axis of convex surface 109. Back mold half 103 defines a central curved section with an optical quality convex surface 109 and a generally parallel concave surface 115. Convex surface 109 has the dimensions of the unswelled back surface curve of the lens to be cast and is sufficiently smooth so that the lens surface formed is of optically acceptable quality. Concave surface 115 of back mold half 103 need not have surfaces suitable to form optical quality surfaces. The back mold half conical seam 117 is continuous with shoulder 118. Outwardly tapering guidewall 119 is continuous with and extends upwardly from shoulder 118. Flange 105 is continuous with guidewall 119 and extends radially outwardly from surfaces 115 and 109. Either or both of the mold halves of the invention may be constructed to include mold tabs, as shown in U.S. Pat. No. 5,540,410.

In FIGS. 5 and 5a are illustrated various views of the two, complementary mold halves, front mold half 102 and back mold half 103, assembled to form a mold. The front mold half 102 defines a central, curved section with an optical quality concave surface 110. Concave surface 110 has a circumferential, well-defined edge 111 extending therearound. As shown in FIG. 5a, the circular edge 111, in conjunction with back surface circumferential edge 120, forms a well defined and uniform plastic radius parting line for the subsequently molded contact lens. Edge 111 typically has a curvature ranging from about 3 to 45 micrometers or less, preferably about 5 to about 30 micrometers, and the surfaces defining the edge may form an angle in the range of about 75 to about 90 deg.

As shown in FIG. 5a, continuous with and extending curvedly upwardly from circular edge 111 toward shoulder 114 is front mold half conical seam 112. Conical seam 112 extends curvedly upwardly from edge 111 at an angle of about 75 to about 85 degrees above a plane normal, or perpendicular, to the axis of symmetry of concave surface 110. Shoulder 114 is continuous with and extends radially outwardly from conical seam 112. Extending upwardly from shoulder 114 is guidewall 125. Guidewall 125 extends from shoulder 114 at an angle of about 45 degrees to about 89 degrees above a plane normal, or perpendicular, to the axis of symmetry of concave surface 110.

Also as shown in FIG. 5a, back mold half 103 has back mold half conical seam 117 extending upwardly from circumferential edge 120 at an angle of about 75 to about 85 degrees above a plane normal, or perpendicular, to the axis of symmetry of convex surface 109. In all embodiments of the mold of the invention, the front and back mold halves' conical seams are complementarily shaped so that the surfaces fit securely together to minimize or prevent side-to-side displacement of the mold halves. Shoulder 118 is continuous with and extends radially outwardly from conical seam 117. Back mold half guidewall 119 extends upwardly from shoulder 118 at angle of about 45 degrees to about 89 degrees.

The length of the conical seams 112 and 117 may be about 50µ to about 500µ. The conical seams 117 and 112 serve to minimize side-to-side movement of the mold halves. Additionally, when pressure is applied to back mold half 103 so that it presses into front mold half 102, excess lens material will be forced from the lens cavity in the direction of shoulders 114 and 118. One ordinarily skilled in the art will recognize that the precise amount of pressure used will depend upon the mold materials used, with higher modulus materials requiring the application of more pressure than lower modulus materials. Preferably, the back mold half is oversized in it diameter about 1µ to about 100µ when compared to the front mold half. This oversizing permits deflation of the front mold half as pressure is applied to the back mold half facilitating movement of the excess lens material away from the lens cavity.

Shoulders 114 and 118 are complementarily shaped with respect to each other and delineate the maximum travel distance over which the front and back mold half may move. The length of each of the shoulders is about 50 microns to about 1000 microns.

Guidewalls 119 and 125 are optionally, but preferably, included in the respective mold halves. The guidewalls may be about 1µ to about 100µ in length. The guidewalls ensure that the mold halves are assembled easily without the need for critical alignment and tolerancing needs for the mold assembly machines.

Figure 6A:
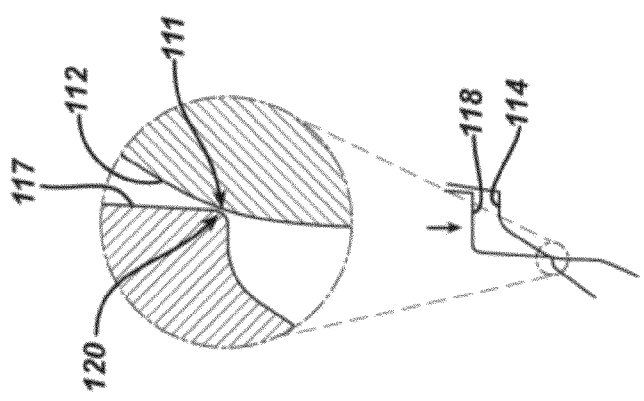
FIG. 6a, 6b and 6c are close-up, cross-sectional views of an area of an embodiment of a mold of the invention.
Figure 6B:
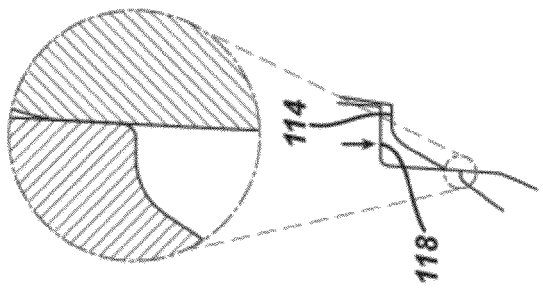
Figure 6C:
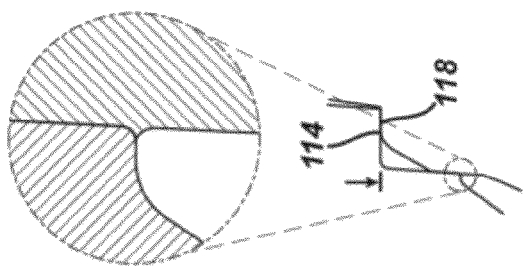

In FIGS. 6a, 6b, and 6c is depicted the way in which the oversizing of the back mold half in relation to the front mold half facilitates interlocking of the mold halves. After the mold halves are contacted, as shown in FIG. 6a, pressure is applied to the back mold half serving to deflect the lower portion of conical seam 112 of the front mold half in an upward direction as shown in FIG. 6b. As pressure continues to be applied onto the back mold half, back mold half circumferential edge 120 is driven into the front mold half.

The mold halves of the invention may be used is useful in producing contact lenses by polymerization of a polymerizable composition. Preferably, the contact lenses produced using the mold assemblies formed from the mold halves of the invention are unhydrated lenses that may be made ready to wear by hydrating, or swelling, the lenses by any method known in the art. Front mold half 102 and back mold half 103 may be formed of any suitable material including, without limitation, glass or a thermoplastic polymer. Preferably, the molds are formed from a material that is sufficiently transparent to ultra-violet light to allow irradiation therethrough to promote polymerization of a contact lens material, preferably a soft contact lens material. Preferred thermoplastic materials for forming the mold halves of the invention are polystyrene and polypropylene. Each mold half may be formed from the same or a different material than the other mold half. Production of the mold halves may be accomplished by any convenient method, but preferably as set forth in U.S. Pat. No. 5,540,410.

In the mold of the invention, more preferably the material used for formation of the back mold half 103 is harder, or less compressible, than that of front mold half 102. Given the configuration of the mold halves of the invention, the use of a softer front mold half material permits the back surface circumferential edge 120 to impinge, or flatten, the front surface circumferential edge 111 when pressure is applied to the mold. This permits the removal of excess lens material from mold cavity at the parting line of the front and back mold halves. Alternatively, a back mold half that is softer than the front may be used resulting in front surface circumferential edge 111 impinging on back edge 120.

In all embodiments, the front and the back mold halves are designed so as to permit rapid transmission of heat therethrough and yet be rigid enough to withstand the prying forces used to separate the mold halves during demolding. The mold of the invention may be used in any method for the manufacture of contact lenses. Generally, in the preferred method, a quantity of polymerizable composition is placed onto the concave surface 110 of front mold half 102, preferably by injection. Back mold half 103 with convex surface 109 facing toward front mold half 102 concave surface 110 is placed onto the polymerizable composition. Preferably, the volume of the polymerizable composition used is greater than the volume of the cavity formed by the two mold halves.

Once mold half 103 is placed onto front mold half 102, the mold halves preferably are pressed together using a force of about 1 to about 5 pounds. The force may be applied to either or both flanges 105 and 106. The force may be applied by any convenient means including, without limitation, using air pressure, mechanical means, such as a spring, or a combination thereof. In one embodiment, a deposition nozzle that is flat-shaped to lay across the flange or one that is a combination of cone and flat-shaped to fit partially into mold half 102 or 103 is used. The force is maintained throughout the polymerization of the polymerizable composition.

The polymerizable composition is preferably polymerized by exposure to ultra-violet radiation. Following completion of polymerization, the mold formed by front and back mold halves 102 and 103, respectively, is disassembled and the cast lens undergoes additional processing.

What is claimed is:

1. A mold for the production of a contact lens, the mold comprising:
    a front mold half, including a first article having a central curved section with a concave surface, a convex surface and a circular circumferential edge, the central section of the concave surface suitable for imparting a curvature to a front curve of a contact lens, the first article also having an axis of symmetry about the concave surface, a front mold half conical seam continuous with and extending curvedly upwardly from the circular edge in a plane about 75 to about 85 degrees above a plane normal to the concave surface axis of symmetry, a front mold half shoulder continuous with and extending radially outwardly from the front mold half conical seam, and an annular flange integral with and surrounding the front mold half shoulder and extending radially outwardly from the concave and convex surfaces in a plane normal to the concave surface axis; and
    a back mold half, including a second article having a central curved section with a concave surface and a convex surface, the central section of the convex surface suitable for imparting a curvature to a back curve of a contact lens, the second article also having an axis of symmetry about the convex surface, a circumferential edge surrounding the convex surface, a back mold half conical seam extending upwardly from the circumferential edge in a plane about 75 to about 85 degrees above the convex surface axis of symmetry, a back mold half shoulder continuous with and extending radially outwardly from the back mold half conical seam, and an annular flange integral with, surrounding and extending radially outwardly from the concave and convex surfaces in a plane normal to the convex surface axis, the front mold half conical seam and the back mold half conical seam having complementarily shapes such that the front mold half conical seam and the back mold half conical seam fit securely together to minimize or prevent side-to-side displacement of the front and back mold halves, wherein each of the front and back mold halves further comprises a guidewall extending upwardly from the first and second shoulder, respectively, the guidewall for the front mold half extending at an angle of about 45 to 89 degrees above a plane normal to the concave surface axis of symmetry and the guidewall for the back mold half extending at an angle of about 45 to 89 degrees above a plane normal to the convex surface axis of symmetry.

2. The mold of claim 1, wherein the front and back mold halves comprise a thermoplastic polymer transparent to ultraviolet light.

3. The mold of claim 2, wherein the thermoplastic polymer is polypropylene or polystyrene.

4. The mold of claim 3, wherein one mold half comprises polystyrene and the other mold half comprises polypropylene.

5. The mold of claim 3, wherein the front mold half is harder than the back mold half.

6. The mold of claim 3, wherein the back mold half is harder than the front mold half.

* * * * *